(12) United States Patent
Leong

(10) Patent No.: US 10,956,491 B2
(45) Date of Patent: *Mar. 23, 2021

(54) METHOD AND SYSTEM FOR USING SAVED SEARCH RESULTS IN MENU STRUCTURE SEARCHING FOR OBTAINING FAST SEARCH RESULTS

(71) Applicant: The DIRECTV Group, Inc., El Segundo, CA (US)

(72) Inventor: Peter Leong, Mountain View, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/253,464

(22) Filed: Jan. 22, 2019

(65) Prior Publication Data

US 2019/0155839 A1 May 23, 2019

Related U.S. Application Data

(63) Continuation of application No. 13/452,693, filed on Apr. 20, 2012, now Pat. No. 10,229,197.

(51) Int. Cl.
G06F 16/638 (2019.01)

(52) U.S. Cl.
CPC .................. *G06F 16/638* (2019.01)

(58) Field of Classification Search
CPC .................................... G06F 16/638
USPC ..................................... 707/722
See application file for complete search history.

(56) References Cited

U.S. PATENT DOCUMENTS

| 6,516,329 | B1 | 2/2003 | Smith |
| 7,099,957 | B2 | 8/2006 | Cheline et al. |
| 8,015,581 | B2 | 9/2011 | Ruiz-Velasco et al. |
| 8,467,275 | B2 | 6/2013 | Emerson et al. |
| 8,775,458 | B1 | 7/2014 | Skare |
| 2002/0057284 | A1 | 5/2002 | Dalby et al. |
| 2002/0129368 | A1 | 9/2002 | Schlack et al. |
| 2002/0157101 | A1 | 10/2002 | Schrader et al. |
| 2002/0166123 | A1 | 11/2002 | Schrader et al. |
| 2005/0123887 | A1 | 6/2005 | Joung et al. |
| 2005/0251822 | A1 | 11/2005 | Knowles et al. |
| 2005/0262245 | A1 | 11/2005 | Menon et al. |
| 2006/0107289 | A1 | 5/2006 | DeYonker et al. |
| 2007/0005563 | A1 | 1/2007 | Aravamudan et al. |
| 2007/0150828 | A1 | 6/2007 | Tsukada et al. |
| 2007/0174861 | A1 | 7/2007 | Song et al. |
| 2007/0244902 | A1 | 10/2007 | Seide et al. |

(Continued)

*Primary Examiner* — Usmaan Saeed
*Assistant Examiner* — Jessica N Le
(74) *Attorney, Agent, or Firm* — Guntin & Gust, PLC; Kenneth Kwan

(57) ABSTRACT

A system and method for searching using a user device associated with a display includes a controller displaying a plurality of search screens on the display device, each of the plurality of search screens perform a content search. The user device also includes a search module generating respective search results from each of the plurality of search screens and a search retention module storing the respective search results in a memory of the user device and retrieving saved search results from the memory corresponding to the previously accessed search screen when a previously accessed search screen is displayed. The controller displays the saved search results.

20 Claims, 14 Drawing Sheets

(56) References Cited

U.S. PATENT DOCUMENTS

| | | |
|---|---|---|
| 2007/0248317 A1 | 10/2007 | Bahn |
| 2008/0034276 A1 | 2/2008 | Ficco |
| 2008/0065988 A1 | 3/2008 | Gupta et al. |
| 2008/0134239 A1 | 6/2008 | Knowles et al. |
| 2008/0176540 A1 | 7/2008 | Khedouri et al. |
| 2008/0184308 A1 | 7/2008 | Herrington et al. |
| 2008/0288461 A1 | 11/2008 | Glennon et al. |
| 2009/0064225 A1 | 3/2009 | Lee |
| 2009/0100459 A1 | 4/2009 | Riedl et al. |
| 2009/0171934 A1 | 7/2009 | Ratnakar |
| 2009/0281994 A1 | 11/2009 | Byron |
| 2010/0071005 A1 | 3/2010 | Kusunoki |
| 2010/0251162 A1 | 9/2010 | Stallings et al. |
| 2010/0262938 A1 | 10/2010 | Woods et al. |
| 2010/0262995 A1 | 10/2010 | Woods et al. |
| 2010/0333139 A1 | 12/2010 | Busse et al. |
| 2011/0023077 A1 | 1/2011 | Simon |
| 2011/0179453 A1 | 7/2011 | Poniatowski |
| 2011/0191314 A1 | 8/2011 | Howes et al. |
| 2011/0191807 A1 | 8/2011 | Kumagai |
| 2011/0225156 A1 | 9/2011 | Pavlik |
| 2011/0289074 A1 | 11/2011 | Leban |
| 2011/0289419 A1 | 11/2011 | Yu et al. |
| 2011/0289530 A1 | 11/2011 | Dureau et al. |
| 2011/0296475 A1 | 12/2011 | Craner |
| 2012/0054211 A1 | 3/2012 | Arsenault et al. |
| 2012/0084291 A1 | 4/2012 | Chung et al. |
| 2012/0102573 A1 | 4/2012 | Spooner et al. |
| 2012/0150888 A1 | 6/2012 | Hyatt et al. |
| 2012/0166961 A1 | 6/2012 | Frazier |
| 2012/0185899 A1 | 7/2012 | Riedl et al. |
| 2012/0190386 A1 | 7/2012 | Anderson |
| 2012/0224835 A1 | 9/2012 | Smith et al. |
| 2012/0240045 A1 | 9/2012 | Bradley et al. |
| 2013/0007618 A1 | 1/2013 | Dodson et al. |
| 2013/0036381 A1* | 2/2013 | Joshi .................. G06F 16/9535 715/808 |
| 2013/0111513 A1 | 5/2013 | Gaude |

* cited by examiner

METHOD AND SYSTEM FOR USING SAVED SEARCH RESULTS IN MENU STRUCTURE SEARCHING FOR OBTAINING FAST SEARCH RESULTS

RELATED APPLICATION

This application is a continuation of the non-provisional application Ser. No. 13/452,693, filed Apr. 20, 2012, the disclosure of which is incorporated by reference herein.

TECHNICAL FIELD

The present disclosure relates to a content processing and delivery system and, more specifically, to a method and system for saving search results within a user device to allow faster display of search results by retrieval rather than repeating the search.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

While providing a large amount of content to consumers is desirable, it is also desirable to allow the consumers to easily find programming to view. Currently, a program guide provides a graphical representation of the content or program events available to a user. A program guide is typically a list of programs, times, and channels for the various content. Only a limited amount of guide material may be displayed on the screen at one time. Thus, the program guide, while useful, becomes a slow way of finding desirable content in a large amount of available content.

Searching by key words is another method for providing content results to users. However, because of the volume of materials set top boxes may have significant time associated with a search. Searching takes place by sorting through all the available content entries. This can take a significant amount of time. Many systems use various screens that, when navigated to, obtain search results.

The processing resources within a set top box are also somewhat limited. Therefore, providing a search that generates results more quickly is desirable.

SUMMARY

The present disclosure provides a system and method for searching program events and displaying the content in an efficient manner for the user to quickly find desirable content.

In one aspect of the disclosure, a method includes accessing a plurality of search screens displayed on a display device associated with a user device, each of the plurality of search screens perform a content search. The method also includes generating respective search results from each of the plurality of search screens, storing the respective search results in a memory of the user device, navigating to a previously accessed search screen of the plurality of search screens, retrieving saved search results from the memory corresponding to the previously accessed search screen and displaying the saved search results.

In another aspect of the disclosure, a user device associated with a display includes a controller displaying a plurality of search screens on the display device, each of the plurality of search screens perform a content search. The user device also includes a search module generating respective search results from each of the plurality of search screens and a search retention module storing the respective search results in a memory of the user device and retrieving saved search results from the memory corresponding to the previously accessed search screen when a previously accessed search screen is displayed. The controller displays the saved search results.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
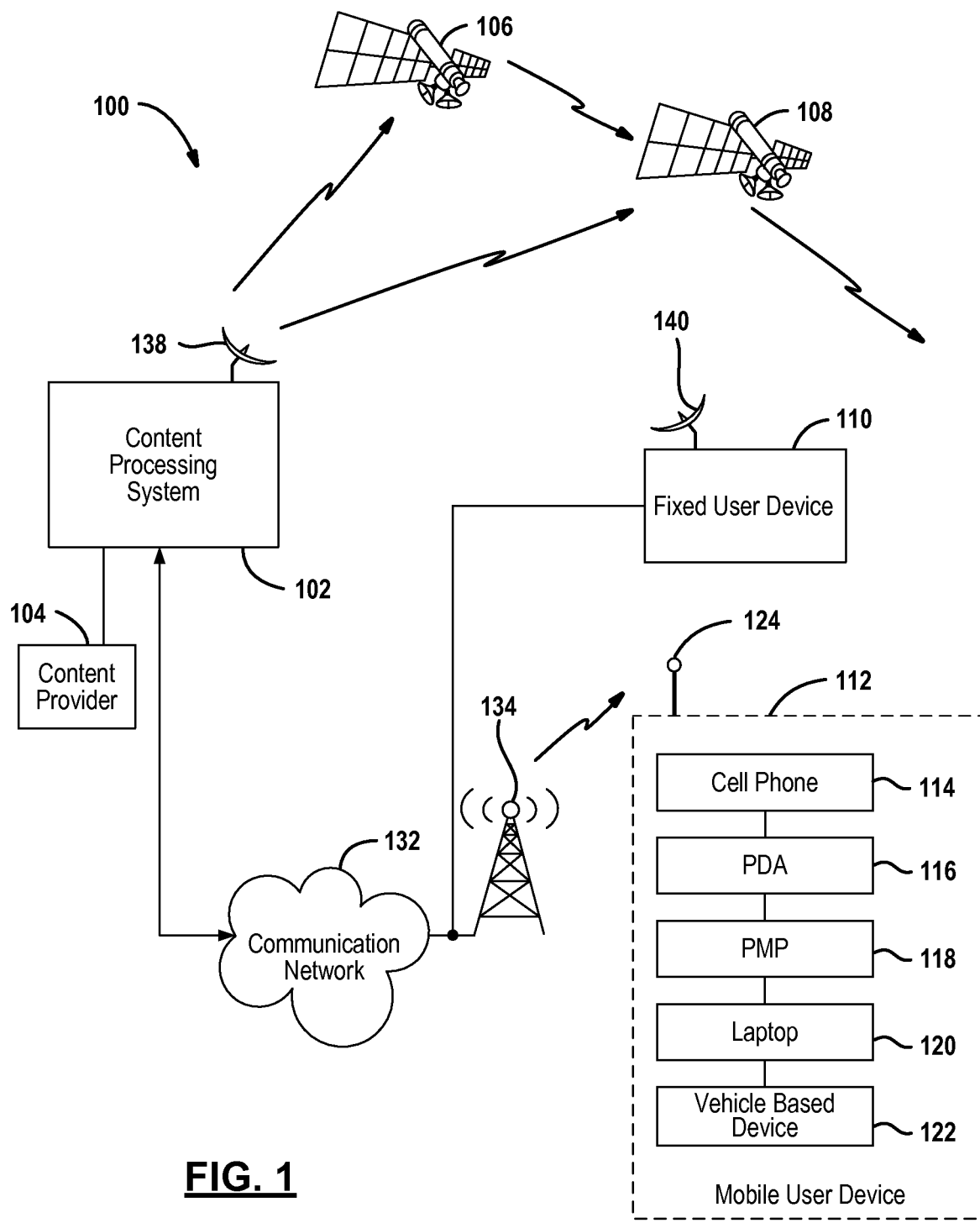
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the content provider 104 may be transmitted, for example, via an uplink antenna 138 to the satellites 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program content and data related to program events to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. A carousel of multiple program materials may be scheduled within the content processing system 102 whereby the satellites 106, 108 may be used to communicate metadata and content to the user devices 110, 112. The repetition rate and blocks of content and metadata may vary. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
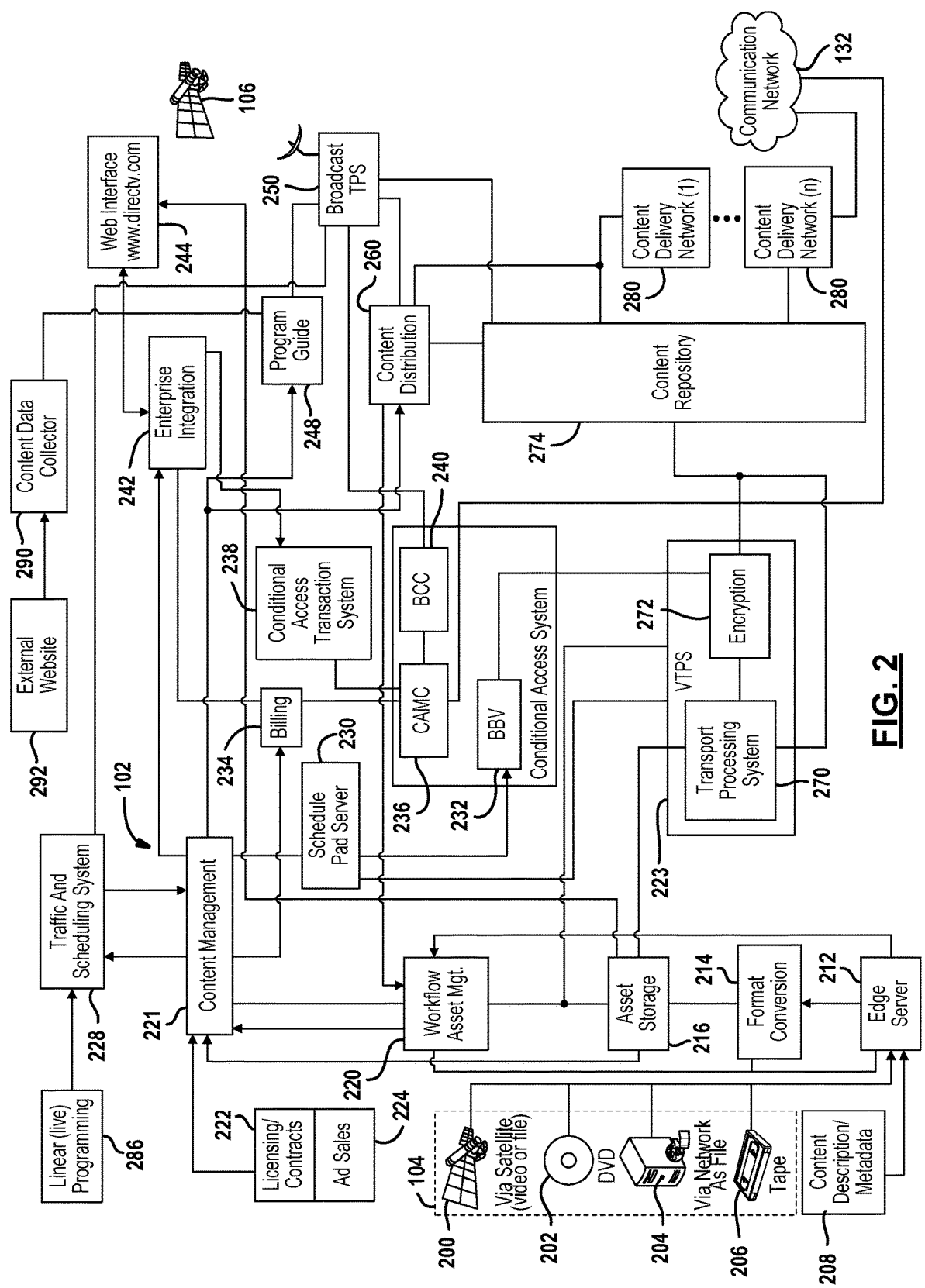
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, digital versatile disc (DVD) 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads). The content providers may provide various types of information including advertising information. Advertising providers may provide information on various products or various available or future content. It should be noted that the advertising provider and the content provider may be one in the same.

Content providers may also have a home page within the present system. Briefly, the home page is a portion of the program guide for selecting content to be downloaded to the user device. The system operator may also have its own home page that has various categories of content. The categories and types of home pages will be described below. The home page provides a listing of on-demand content for the particular subscriber. On-demand content may be described as broadband content because it may be delivered using a broadband network.

The home page may be formed in various configurations including a menu structure. The content providers may also provide various metadata for the menu structure or program guide.

Another area of the content processing system 102 is an input server 212 that receives the various content and converts the format in a format conversion system 214. A house format asset storage server 216 may be used to store the content asset in a house format. Still image files, trailers, posters, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packet. The encoder may encode the data according to the CableLabs® Video-on-Demand (VoD) encoding specification MD-SP-VOD-CEP-I01-040107 (i.e., performs asset encoding). The encoded data is then packetized into a stream of data packets by the transport processing system 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier such as a program identifier (PID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. This may include both on-demand programming and linear programming 286. For example, a live TV program for which a high demand for reruns might be expected could be assigned a high priority for content processing. The linear programming 786 provides live broadcasts through the satellite.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., On-Demand or PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Record requests may also be provided from the conditional access transaction system 238. A conditional access system broadcast control center (BCC) 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface 244 such as DIRECTV.com®. Various ordering information, such as ordering broadband (on-demand) video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Content data such as, but not limited to, titles, descriptions, actor names, biography data, various content categories (e.g., comedy, family) and metadata from the content management system 221 may be provided to the advanced program guide (APG) module 248 as a key word. The program guide module 248 may be coupled to a satellite broadcasting system such as a broadcast transport processing system 250 that broadcasts linear, on-demand content and guide data to the users through the satellite 106, 108.

The program guide data generated by the program guide module 248 may include content data signals that are communicated to a user device and is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs. The program guide data may also be used to generate an event table to enable a reduced time search.

Content data such as titles, descriptions and categories may also be provided from the content management system 221 to the content distribution system 260. Content files and metadata may be controlled by the content distribution system 260.

Various types of container or data objects may be used to communicate the program guide content to the user devices. The container objects may be formed and/or communicated through the program guide module 248. For example, a program object (PO) may be used to communicate data that may include, but is not limited to, category, title, rating, description, name, credit, related shows, pay-per-view price, studio, and the like. A channel object (CO) may communicate frequency, category rating, network, channel name, event start time, event end time and number. A schedule object (SO) may schedule a 24-hour block bridge between the channel and the program. The channel video-on-demand object or broadband catalog object (BCO) may also be provided and provide the list of content and data to be displayed in the video-on-demand categories. Such content may be communicated using a broadband network rather than the satellite system. The categories and the contents of the categories will be further described below. Another type of object is a boot event object (BEO). The boot event object is an object that provides schedule data in a similar manner to the schedule object described above. Typically the boot event objects are a smaller set of data that is used when the set top box is booting up. The boot event objects are used so that the set top box may populate the program guide as quickly as possible and provide a reasonable set of initial events. Typically, boot event objects provide about two hours of events starting with currently available data. Once the set top box has been booted, the set top box uses schedule objects or other objects to supplement the data provided by the boot event object.

The video transport processing system 223 may includes a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280a-n may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

The content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or assets asset files, menus structures etc.) and/or live (linear) content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A content data collector 290 may also be associated with the content processing system 102. The content data collector 290 may be a separate resource or be included within the content processing system 102. The content data collector 290 may be used to collect various types of data about content from an external website or websites 292. The external website 292 is an external source of data that is provided to the content data collector 290. The content data collector 290 may search for content on an external website 292 about various content titles, actors within the content titles, descriptions, filmography and content related to the content titles. In the present example, the external websites may be entertainment websites, sports websites, or various other types of websites. By way of example, the content data collector 290 may search for various terms such as content titles, actors, or other data. The external websites 292 may also provide information as to predicted ratings for various programming. One example of a website for data is Tribune Media Services (TMS) ON® service. The content data collector 290 may be in communication with the program guide module 248 which communicates the program guide content as well as other data to the various user devices.

Figure 3:
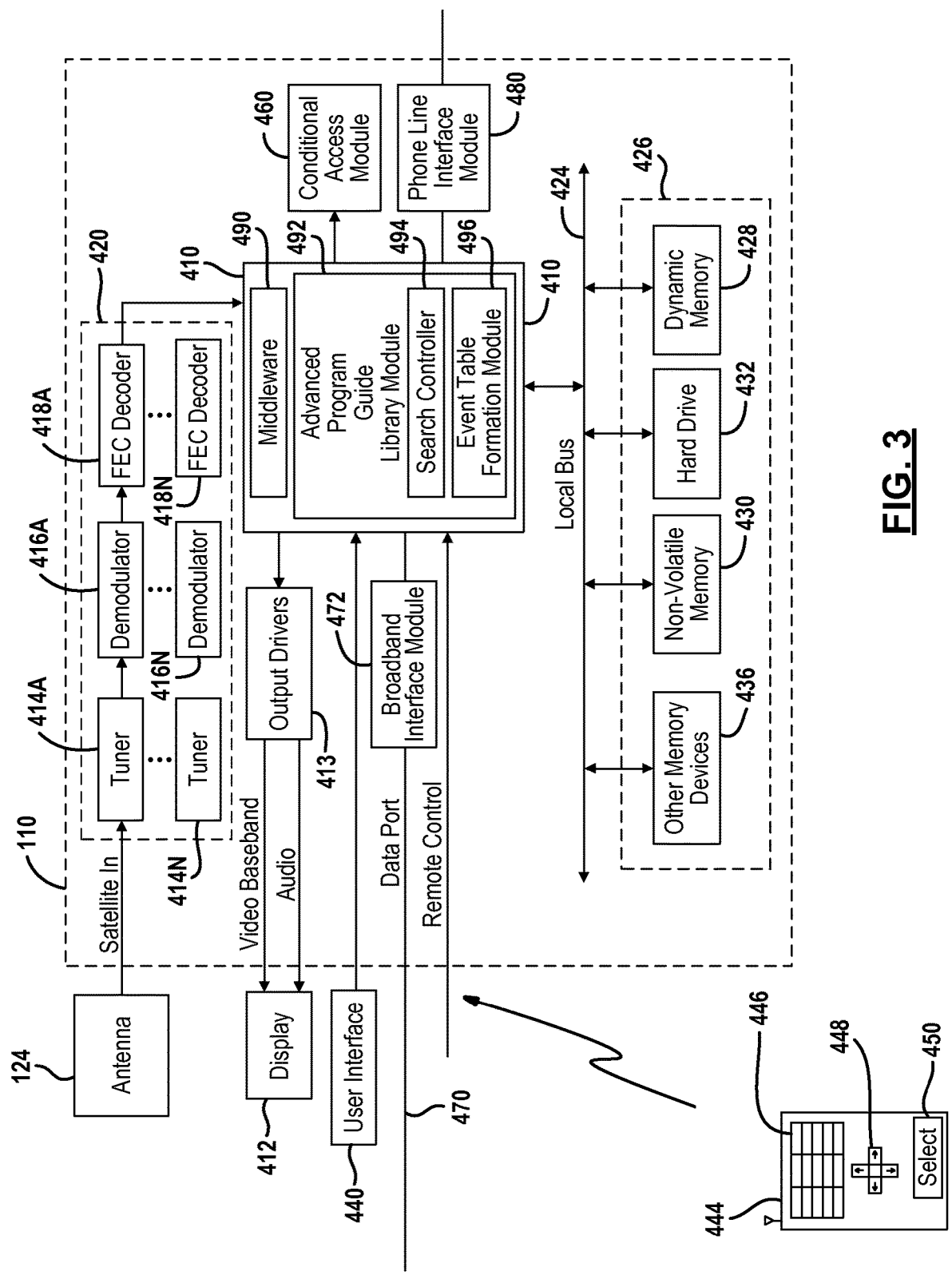
FIG. 3 is a detailed block diagrammatic view of the user device of FIG. 1.

Referring now to FIG. 3, a user device 110 such as a fixed user device is illustrated by way of example. A similar configuration for a mobile user device may also be used. The fixed user device may include the fixed antenna 124. If the user device is a mobile user device, the antenna 124 may be a rotating antenna that is used to track the relative movement of the satellite or an omni-directional antenna that may receive antenna signals from various directions.

The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a receiving circuit 420. The receiving circuit 420 may include a tuner 414, a demodulator 416, a forward error correction decoder 418 and any buffers or other functions. More than one tuner, demodulator and FEC decoder may be provided as indicated by the reference numerals "A" and "N". One constructed embodiment may include four tuners, demodulators and decoders, although various numbers of tuners, demodulators and decoders may be provided depending upon the system requirements. The tuner 414 receives the signal or data from the broadcast channel. The signal may include programming content or different types of data including program guide data. The demodulator 416 demodulates the signal to form a demodulated signal or demodulated data. The decoder 418 decodes the demodulated signal to form a decoded data or decoded signal.

The controller 410 may also be coupled to a local bus 424. The local bus 424 may be used to couple a memory 426, including a dynamic memory 428, such as random access memory (RAM) which changes often and whose contents may be lost upon the interruption of power or boot up. The bus 424 may also be coupled to a non-volatile memory 430. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 432 may also be in communication with the local bus 424. The hard drive 432 may act as a digital video recorder for storing video and storing various data and various content. The hard drive 432 may also be interchangeable with another memory device with a large capacity.

The various data stored within the memory 426 may include metadata such as titles, actors, directors, descriptions, posters, identifiers, event start times, event end times, availability start times, availability end times, pricing data, timing data, program guide data, event tables, internal data regarding tuning, search recording and watching recorded content and various other types of data.

Other memory devices 436 may also be coupled to the local bus 424. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface 440. The user interface 440 may be various types of user interfaces such as a keyboard, push buttons, a touch screen, a voice activated interface, or the like. The user interface 440 may be used to select a channel, select information such as search criteria, change the volume, change the display appearance, or other functions. The user interface 440 may be used in addition to a remote control device 444. The remote control device 444 may include a keypad 446, an arrow keypad 448, and a select button 450. Inputs to the user device 110 may be provided by the remote control device or through the user interface 440.

A conditional access module card 460 (CAM) may also be incorporated into the user device 110. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals are provided through the broadband interface module 472 and the phone interface module 480.

The controller 410 may include middleware 490. The middleware 490 is an application to interface with the inputs from user interfaces (as selected by a user) and communicate with an advanced program guide library module 492. The middleware 490 may receive search results and generate screen displays for displaying the search results or search results screen displays to a user associated with the user device 110.

An advance program guide library module 492 in this example is used to perform the actual searches and generate event table. Of course, standalone modules may also be used. The advance program guide module 492 may include a search controller 494 and an event formation module 496. The details of the search controller 494 and the event table formation module 496 will be further described below. In general, the search controller 494 is used for performing various functions including searching event tables and obtaining other content search data after searching the event table is performed.

The event table formation module 496 is used to generate event tables from the various received container objects. The event table formation module 496 is searchable by event times such as start times and end times. As will be described below, search windows associated with various events may be used to allow the search controller 494 to rapidly find search results.

Figure 4:
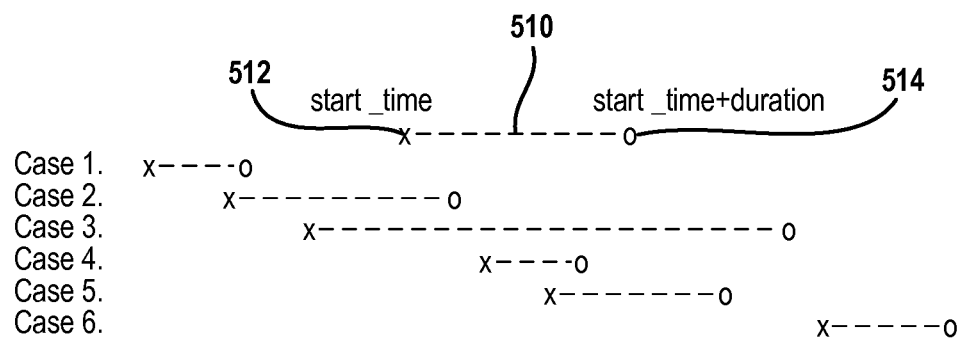
FIG. 4 is a diagrammatic view of a time interval for use in a search window.

Referring now to FIG. 4, a time interval 510 is illustrated having a start time 512 and an end time which is referred to as a start time plus a duration. The search interval is the time interval 510. It should be noted that the interval is closed on the left side or start time 512 and is open to the right.

The illustrated cases are associated with various types of content. In this example, six cases are provided. Case 1 corresponds to strictly past events. Case 2 corresponds to past events and overlaps with inside the search window events (overlap future). Case 3 overlaps the past and overlaps the future which also includes the inside search window time. Case 4 corresponds to an interval within the search window. Case 5 starts within the search window, overlaps the future and past events. Case 6 corresponds to a strictly future event.

Figure 5:
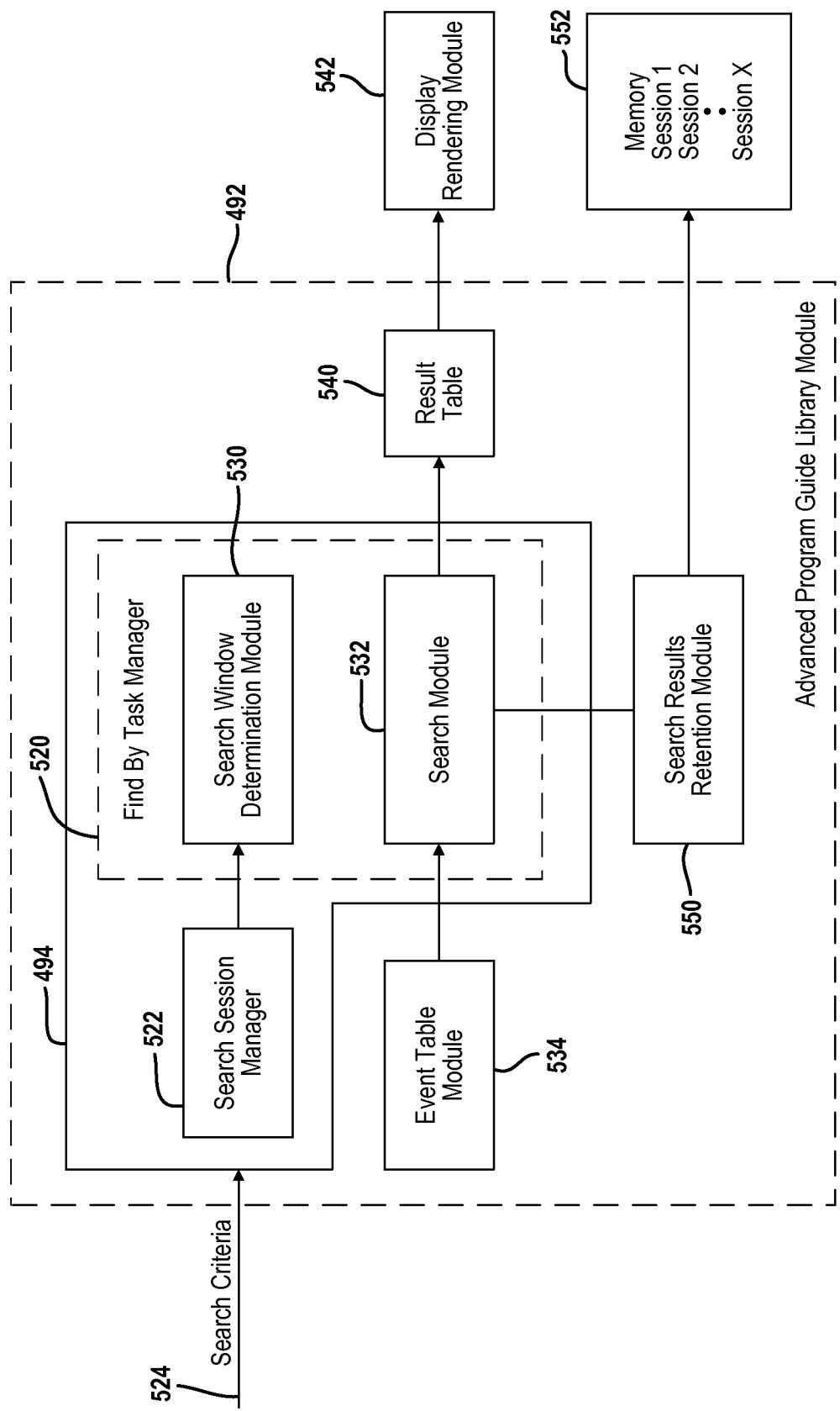
FIG. 5 is a block diagrammatic view of the search module in relation to the receiving circuit and the memory.

Referring now to FIG. 5, the search controller 494 is illustrated in further detail. The search controller 494 is disposed within the advance program guide library module 492. As mentioned above, the advance program guide library module 492 receives container objects and generates a program guide in response thereto. Also, the advance program guide library module 492 may be used for performing searches for various events which may be referred to as find by tasks. A find by task manager 520 performs the actual searches. A search session manager 522 is used to control the initiation of a search session and communicating the search session results to the middleware 490. The search session manager 522 also receives search criteria 524 that are used by the find by task manager 520 to perform the actual search.

A search window determination module 530 is included within the find by task manager 520. The search window determination module 530 determines a search window based upon the search criteria and the type of content corresponding to the search criteria. Typically, a user enters the content desired to be searched by making selections using a user interface associated with the user device. Some users may directly specify linear content while other content determinations may be generated by the context of the searches desired. Combinations of cases may be used to form a search window. That is, the time interval of different cases depending on the content type. For example, linear content may include cases 2, 3, 4 and 5 as described above. Likewise, broadband content may also use cases 2, 3, 4 and 5 to establish the search window. DIRECTV® currently has a "What's On Now" selection for linear content. "What's On Now" refers to content that will be available in the next half-hour time slot and beyond. This case corresponds to cases 4 and 5 for the search window.

DIRECTV® also has a menu selection called "In Theaters" in which events are announced but are not available for download yet. This case corresponds strictly to case 6. Of course, other types of combinations of cases may be formed for different types of content.

The find by task manager 520 includes a search module 532 that is used to perform the actual search. The search module 532 searches the event table module 534 for event table contents. The formation of the event table will be described further below. The event table module provides an abbreviated listing that is searchable based upon time. By providing time-based listings, the search window determined in the search window determination module 530 may be used to quickly limit the amount of searching performed. The output of the search module 532 comprises search results that are stored within a result table 540. The result table 540 is disposed within the advance program library module 492. However, other types of storage for the result tables such as in the memory 426 of FIG. 3 may also be performed.

To generate a display corresponding to the result table 540, a display rendering module 542 is set forth. The display rendering module 542 formats the display for the user on a user display.

A search results retention module 550 is used to coordinate the retention of the search results in a memory 552. The memory 552 may be part of the memory 526 described above. The memory 552 may store various search sessions from various screens. As will be described below, as the user moves from screen to screen and performs various searches, the memory 552 may store a particular number of sessions so that the searches do not have to be re-performed. The search results retention module 550 may use different criteria such as saving the last four searches or may use other criteria such as the likelihood or frequency that a search will be performed. For example, the frequency of a home screen being accessed is often compared to a far-reaching screen such as an actor-information screen. Another deciding factor for the search results retention module 550 may be "cost." The cost refers to the amount of execution time required to perform a search. Searches with a high execution time or high cost may be stored so that they do not have to be repeated. Statistical analysis based upon typical user actions may be performed and provided to the user device for typical conditions. Of course, such statistics may also be calculated at the user device.

Figure 6:
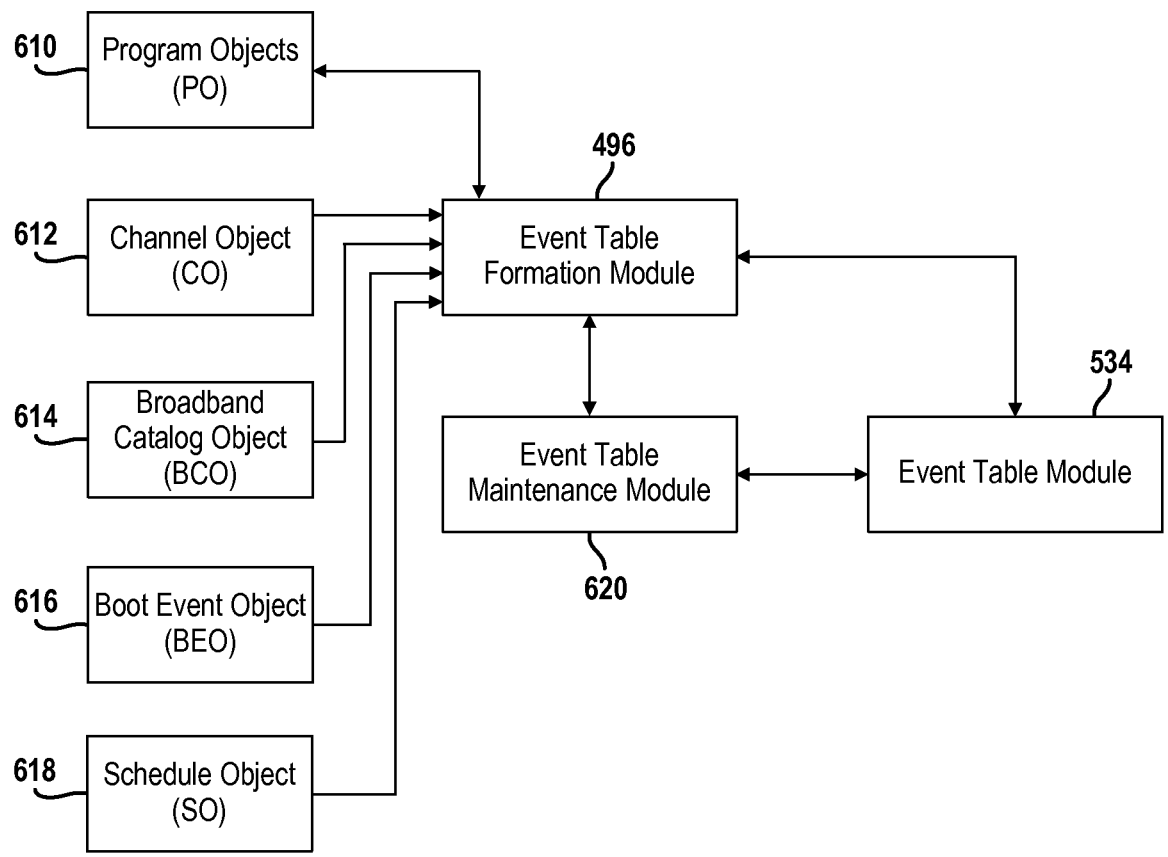
FIG. 6 is a block diagrammatic view of the event table formation module.

Referring now to FIG. 6, the event table was briefly described relative to an event table module 534. FIG. 6 illustrates details of the event table formation module. The event table formation module 496 receives container objects including, but not limited to, program objects 610, channel objects 612, broadband catalog objects 614 and boot event objects 616 and schedule objects 618. The container objects 610-618 may be received through the program guide system. The container objects 610-618 may be referred to as container objects because they contain further data that may be used for further searching after the initial event table search. That is, the advance program guide module 248 illustrated in FIG. 2 may be used to communicate the objects to the user device. The event table formation module 496 extracts various data from the various objects and generates an event table. The event table will be described below relative to FIG. 7. The event table formation module 496 may continually receive the various objects 610-618.

The event table formation module 496 may also be associated with an event table maintenance module 620. The event table maintenance module 620 may be used to maintain the event table objects in the event table module 534. The event table maintenance module 620 is used to remove old data and add new data to the event table module 534. The event table maintenance module 620 may review the data within the event table module and determine whether the various objects that it was derived from have expired. The event table maintenance module 620 may remove expired data on a periodic basis such as once a day. The event table maintenance module 620 may also be used to add new data to the event table module 534. The event table maintenance module 620 may continually add new data to the event table module on a real-time basis to allow the user to have the most up-to-date data.

Figure 7:
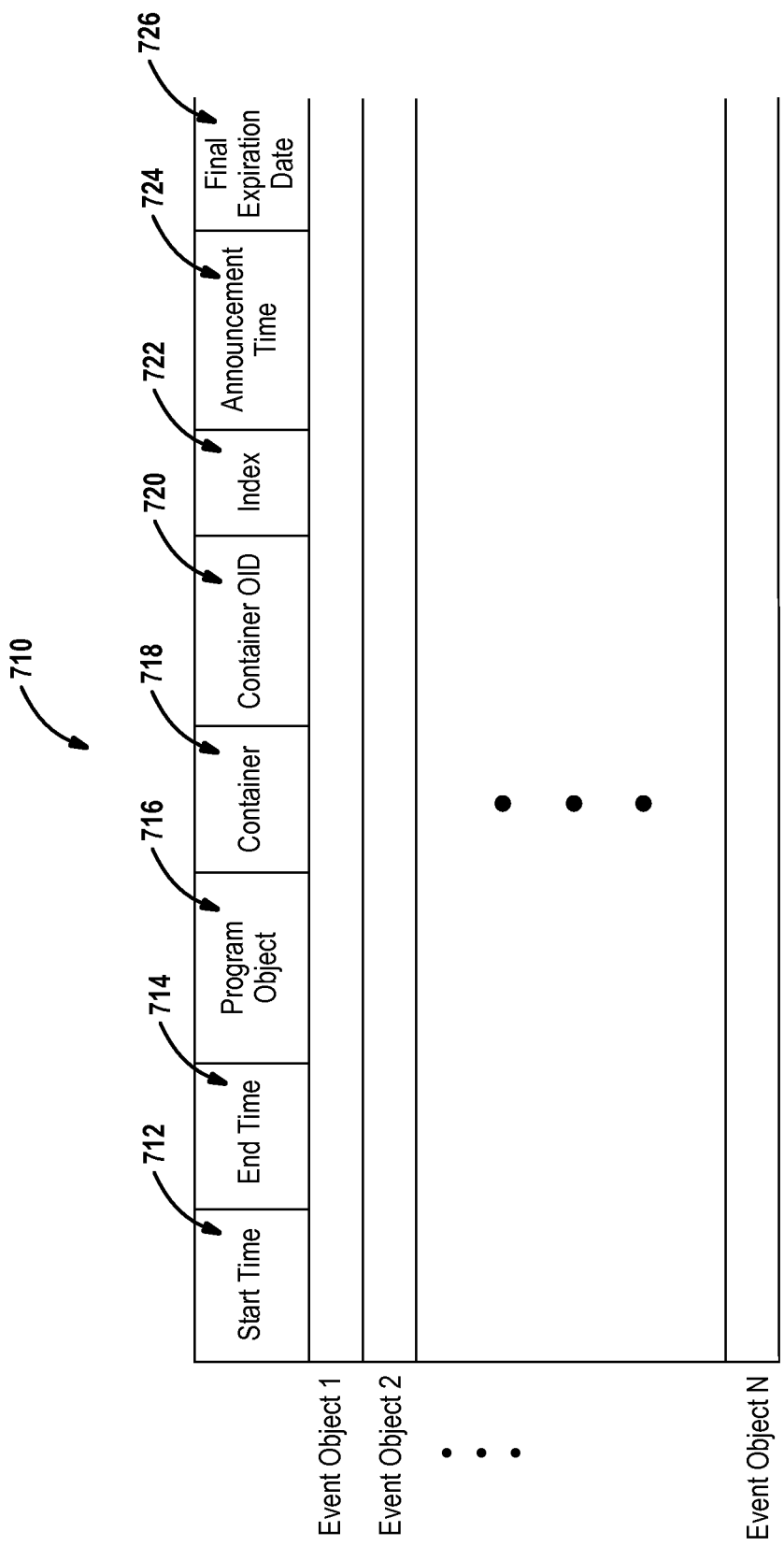
FIG. 7 is a block diagrammatic representation of an event table according to the present disclosure.

Referring now to FIG. 7, one example of an event table 710 is set forth. The examples of event object data are presented by way of example only. As mentioned above, the event table 710 is used to link the program object identifier to various corresponding program data and events through the container objects. By skipping unnecessary events, the search results may be provided more rapidly. The event table 710 is formed from the data obtained from the container objects described above such as the program object, channel object, broadband catalog object, channel object and boot event object. The event table 710 may include an event time such as a broadcast start time 712 and a broadcast end time 714 for various events. A program object 716 may also be associated with the event. A container type 718 may also be provided. The container type describes the type of object that contains the event. A container object identifier (OID) 720 contains the object identifier of the program guide object that contains the event object. The container OID 720 helps the table obtain the proper type of object from which the data was generated. An index 722 may also be provided. An announcement time 724 and a final expiration date (FED) 726 may also be associated with the event table. The announcement time 724 and FED 726 may correspond to the time that content is to be displayed within the program guide. The FED may correspond to the time that content corresponding to the event may expire. Typically the content rights holder establishes the final expiration date.

The search module uses the event time such as start time, end time, or both and compares them to a search window. Program objects may be retrieved based upon the overlapping of the start time or end time with the search window generated in response to the type of object that was searched for. Each event object may include all or some of the data in columns 712-726.

Figure 8:
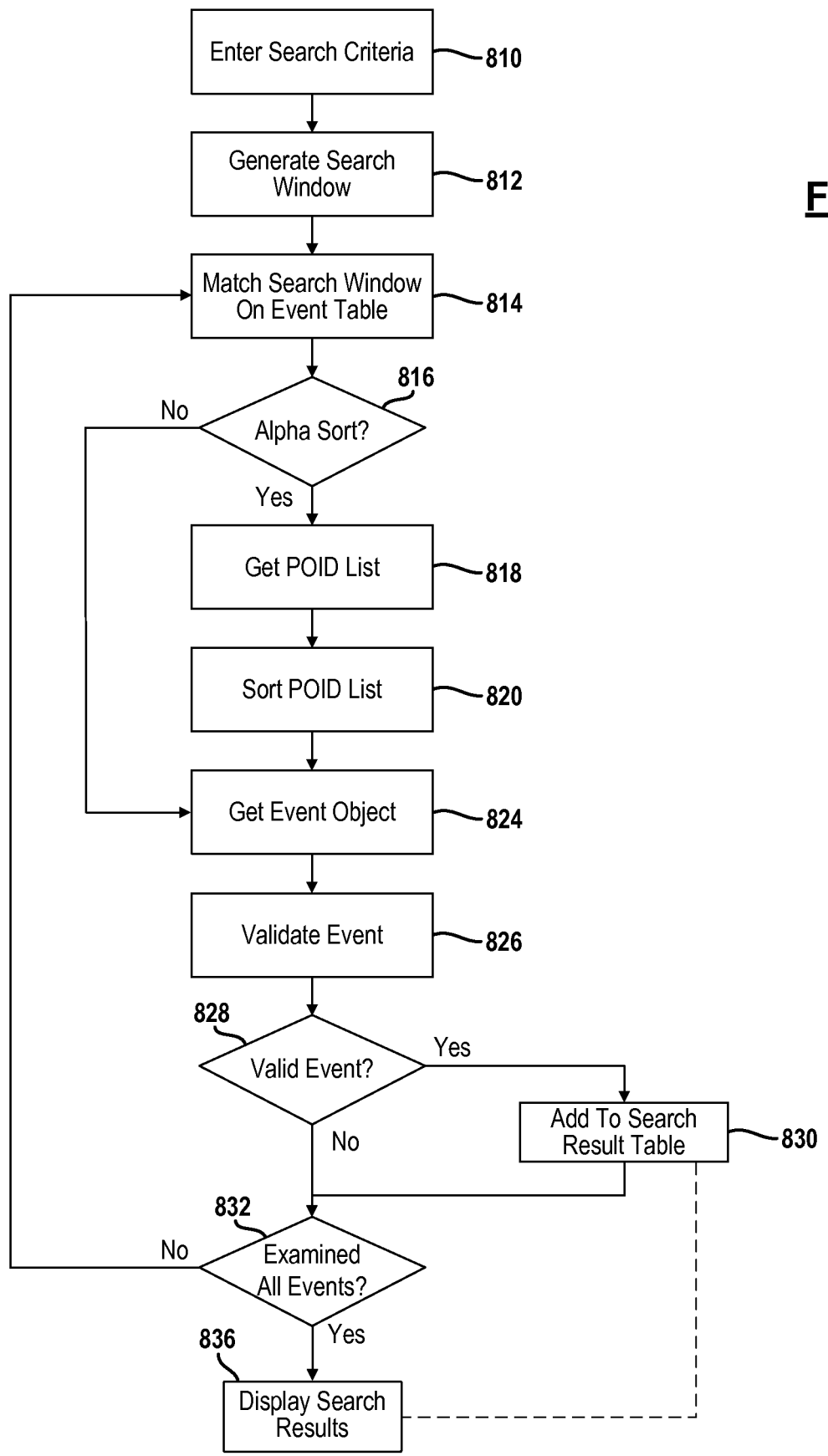
FIG. 8 is a flowchart of a method for searching data.

Referring now to FIG. 8, a method for performing a search is set forth. In step 808, an event table is generated from various objects such as program guide objects, broadband catalog objects or schedule objects. These objects may be referred to as container objects because they contain further data that is used later. The event objects link to the container object so further data may be obtained after the initial event table reduction search or "cut."

In step 810, the user of the user device enters search criteria into the user device. This may be performed in response to different types of screens displayed on the display associated with the user device. The search criteria or search elements entered may be entered directly through a keyboard or by selecting various pre-determined search elements or search criteria on a screen display. Actual words may be directly input as well.

In step 812, the search window is generated based upon the search criteria. As mentioned above, the search criteria may have direct linkage to the type of content or program event that is sought to be searched for. A type of event may include, but is not limited to, linear content, broadband content, "What's On Now" content, "In Theater" content, or the like. The type of event or events is determined from the search criteria. More than one type of content may be simultaneously searched so combinations may be used in defining the search windows. The search window is generated from the type of event from the search criteria in step 812. In step 814, a search window is matched to the event table. Thus, by comparing the search window with the time or times associated with the events in the event table, various program events or objects may be determined. The event results may be referred to as window-matched results. The time criteria may be an initial criteria for performing the searching. By determining the search window, a number of event table entries are not searched and are resulting in more rapid completion of a search. That is, the number of program events is quickly reduced from being produced or generated in final search results. Of course, other data besides merely time may also be provided. Such things as actor names, program names, producer names, studio names, titles of content, and the like may also be searched. The additional searching is performed below. The application of the search window provides an initial "cut" of data. The initial cut of data does not contain titles or other searchable data. The first cut of data merely contains program identifiers that may be used to obtain such data for further searching.

Ultimately, an alphabetic or numeric sorting may be performed. Whether an alphabetic sort is going to be provided is determined in step 816. When alphabetic sorting is not going to be used, time sorting is performed. A time sort is based upon the event table time entries.

When an alphabetic sort is going to be performed in step 816, step 818 is performed. In step 818, a program object identifier list corresponding to the various events matched within the search window may be generated. The program objects link with the container objects from which the event table objects were identified. The program identifier list may be sorted in step 820. In step 816, when alphabetic sorting is not performed and after step 820, the event object may be screened. The event object may screen or sort the program objects based upon various data such as subscription data. Subscription data corresponds to the subscriptions that the particular user or subscriber is subscribed to. For example, many movie channels require an additional subscription and subscription cost.

In step 824, the screened event objects are validated in step 826. The event objects and the data from the container objects are used to perform further searching for valid events that correspond to other search criteria entered in addition to the already-searched or time-narrowed results. The program objects are used to obtain data from the container objects such as actor names, titles, etc. Such things as actors, titles or the like may be reduced further based on the search criteria. In step 826, the data in the container object is used to find valid events or search results. In step 828, if the event is a valid event, meaning the search results match data in the container object, step 830 adds the results or identification of the specific data to a search result table. In step 828, when the event is not a valid event, the event is not added to the search results. After a negative response in step 828 and after step 830, step 832 determines whether all the event objects have been examined. If all the events have not been examined, step 814 is again performed so that all of the event objects are obtained. After step 832, when all of the events have been examined, step 836 displays the search results.

Figure 9:
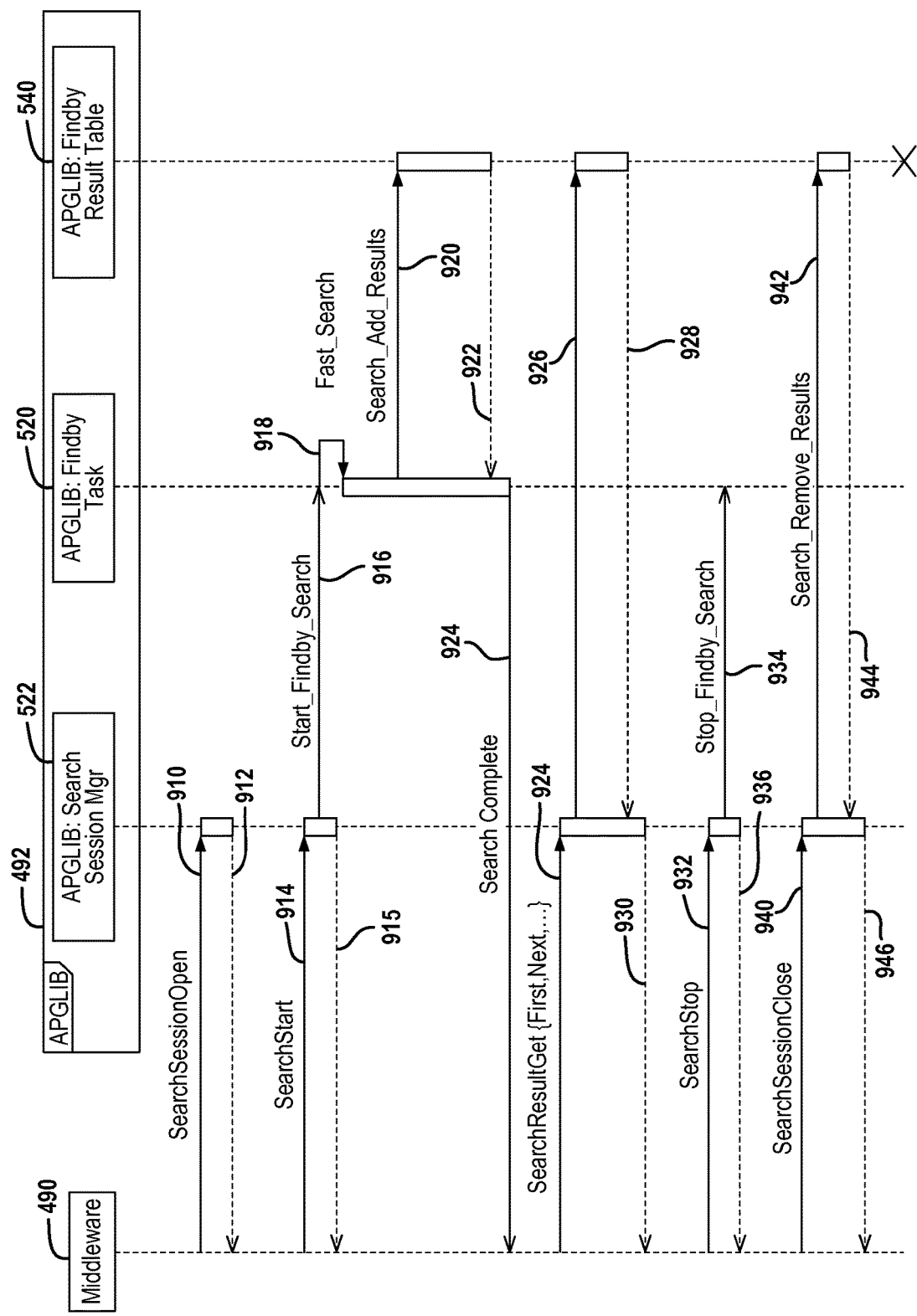
FIG. 9 is a sequence diagram of the user device performing a search at the middleware using the APG library.

Referring now to FIG. 9, the interaction of the middleware 490 and the advance program guide library module 492 is set forth. As was illustrated above, the advance program library module 492 may have modules therein. A search session manager module 522, a find by task manager 520 and a find by results table 540 may all be within the advance program guide library module 492. Of course, these components of the functions performed therein may be provided or performed in other places within the user device. In step 910, a search session is open by the middleware 490. The middleware may be triggered to open a search session when the user makes a selection through the user interface. In step 912, a search session identifier may be returned to the middleware 490 from the search session manager 522. In step 914, a start search may be generated at the middleware and communicated to the search session manager 522. A response signal 915 may be generated after the search start signal 914 is communicated and received by the search session manager 522. A "find by" search may be initiated by the find by search signal 916 and communicated from the search session manager 522 to the find by task manager 520. In step 918, a "fast" search may be performed within the find by task manager 520. Fast search refers to searching using an event table to quickly narrow results. As results are found, the search results are added to the find by results table 540 using a search add results signal in step 920.

A response signal 922 may be generated from the find by result table 940 after a task has been entered in the result table. When the search results are complete, a search complete signal 924 may be communicated from the find by task manager 520 to the middleware 490.

Other commands may also be performed in the searching process such as a get result signal 924 which is used to obtain the results from the search table using signal 926. A response signal 928 provides the search results from the result table to the session manager 522. A search result signal 930 from the session manager 522 may be generated and communicated to the middleware in step 930. The providing of search results may also be terminated using a search stop signal 932 generated from the middleware and communicated to the session manager 522. The stop find by search signal 934 is communicated to the find by task manager. An acknowledgement or response signal 936 may be communicated back to the middleware when the search has been stopped.

Closing the search session may also be performed in which the search data results are removed from the search results table 540. Step 940 generates a session closed signal which is communicated from the middleware 490 to the search session manager 522. The search session manager communicates the session closed signal to the find by results table 540. The search session manager 522 communicates a remove results signal 942 to the results table 540. A response signal 944 may be generated at the results table when the data has been removed. The signal 944 may be communicated from the results table 540 to the session manager 522. A response signal 946 may be communicated from the session manager to the middleware 490.

Figure 10:
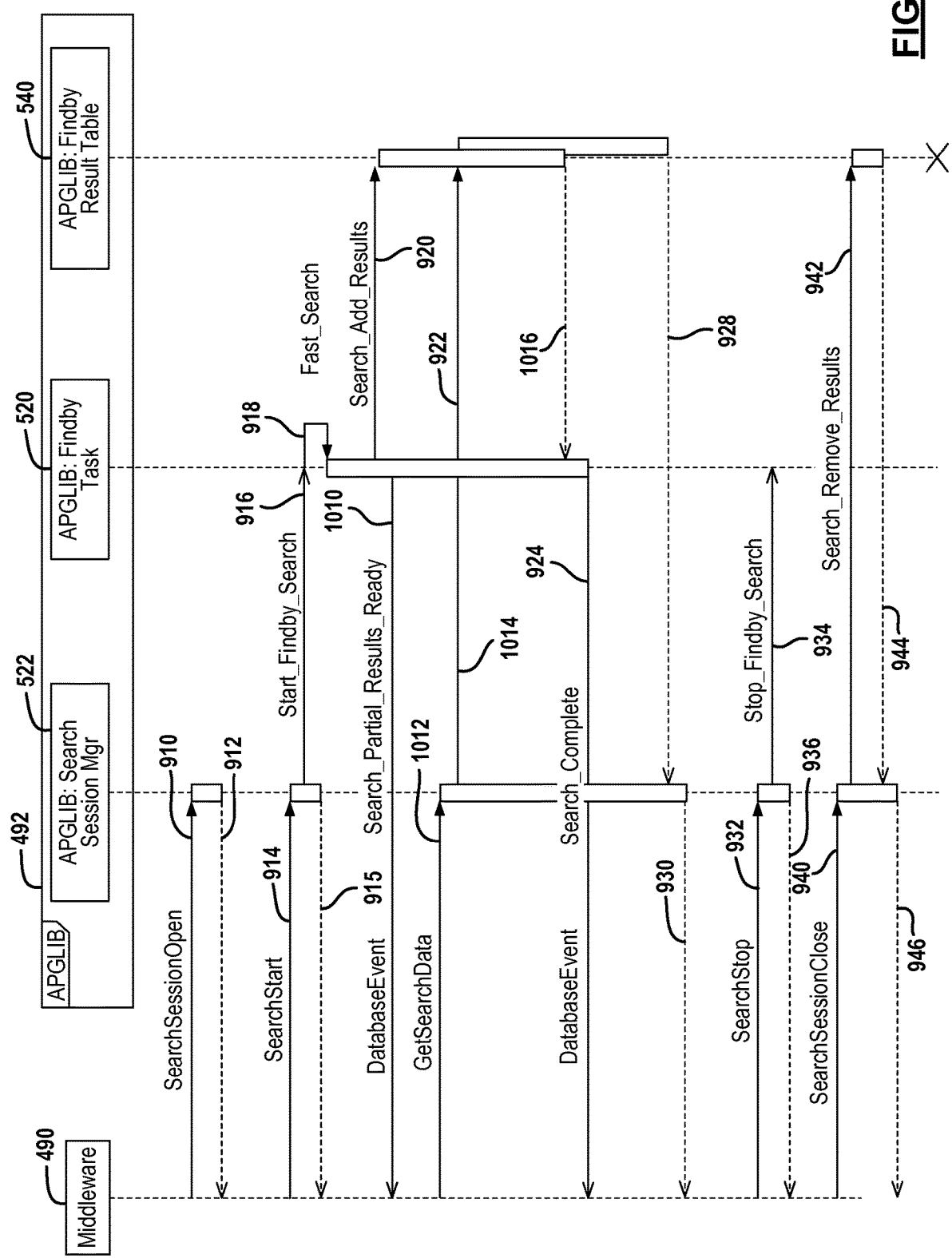
FIG. 10 is a sequence diagram of a search that uses trickling display.

Referring now to FIG. 10, a method for providing search results using trickling is set forth. The sequence diagram illustrated in FIG. 9 corresponds to generating the results and after all the results are generated, the result table is displayed. However, for more prompt results, the system may perform trickling. Trickling is the displaying of results as they are obtained rather than waiting until all the data is searched to generate the screen display. Many steps set forth in FIG. 10 are identical to FIG. 9 and are not described again. One new signal in FIG. 10 is a partial results ready signal 1010. A partial results ready signal 1010 is generated at the find by task manager 520 that is performing the search. When partial results are ready, the find by task manager 520 communicates the signal to the middleware 490. In step 1012, the middleware 490 generates a get search data signal 1012 and communicates the data to the search session manager 522. The search session manager 522 thus generates a get search data signal 1014 and communicates the get search data 1014 to the result table 1014. The result table 540 generates a result signal 1016 that communicates results back ultimately to the middleware 490. The remaining signals such as the search complete signal 924 through the response signal 946 are all identical in function to those in FIG. 9 and thus will not be described further here.

Figure 11:
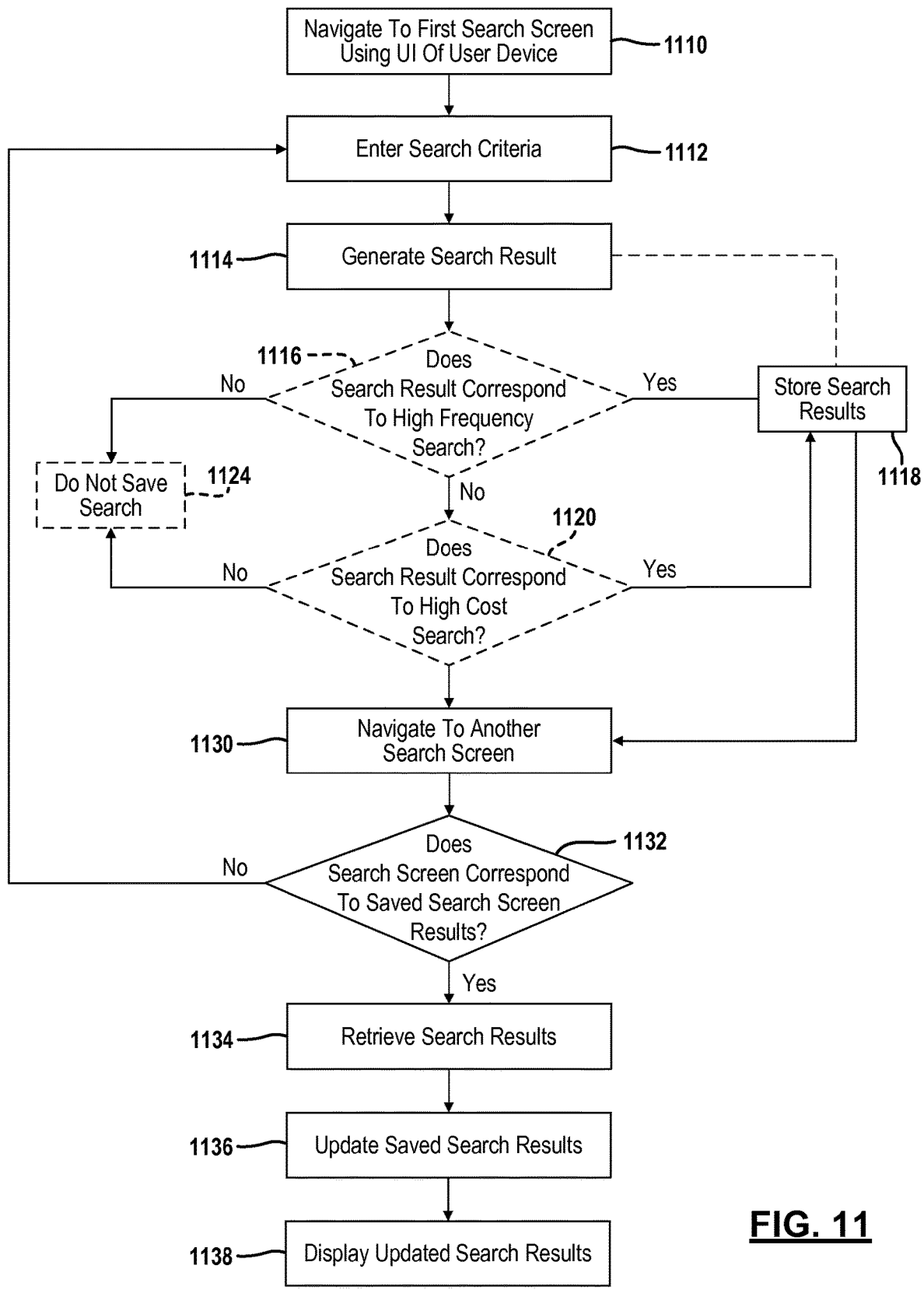
FIG. 11 is a flowchart of a method for saving search results during navigation.

Referring now to FIG. 11, as mentioned above, it may be desirable to save search results. The search results retention module 550 of FIG. 5 may be used to maintain search results from different searches so that searches are not required to be completely repeated. This is useful when certain screen displays cause searches to be performed. In step 1110, a first screen for searching is navigated to by the user looking for programming events. In step 1112, search criteria may be entered based upon a user selection from a remote control or other type of device. In step 1114, search results are generated as described above relative to FIGS. 8-10. Search results may be saved for a predetermined number of searches or based on criteria such as frequency of the search or cost of the search. Cost and frequency based storing are optional as described below.

In step 1116, it is determined whether the search results correspond to a high frequency search. Step 116 is an optional step. A high-frequency search corresponds to a search that may be performed often relative to the menu structure set forth by the user device. If the search results are a high-frequency search, the search results may be stored in step 1118.

Referring back to step 1116, another optional step 1120 may also be performed. Step 1120 determines whether the search results correspond to a high-cost search. High cost refers to the amount of time required to perform a search. Further, either step 1116 or step 1120 may be performed, but not both. Also, steps 1116 and 1120 may be eliminated altogether and step 1118 may be performed after step 1114. If the search does correspond to a high-cost search, step 1118 may be used to store the search results. If the search results do not correspond to a high-cost search, the search results may not be stored in step 1124. Step 1124 may also be performed when the search does not correspond to a high-frequency search.

After the search results are stored in step 1118, the user may navigate through different screens displayed by the user device on the display associated with the user device in step 1130. After step 1130, step 1132 determines whether the search screen corresponds to a save search result screen. If the search results do not correspond to a save search result screen, the search criteria is used to perform another search beginning in step 1112. In step 1132, when the search screen does correspond to a save results screen, step 1134 retrieves the search results that were stored in step 1118. Optionally, the retrieved search results may be updated. Search data may be continually updated and thus new results may be required. However, updated searches are only required for newly received data received since the last search. Typically, the newly received data is a small amount of data that can be searched quickly. Step 1138 displays the search results without delay on the display device associated with the user.

Figures 12A, 12B:
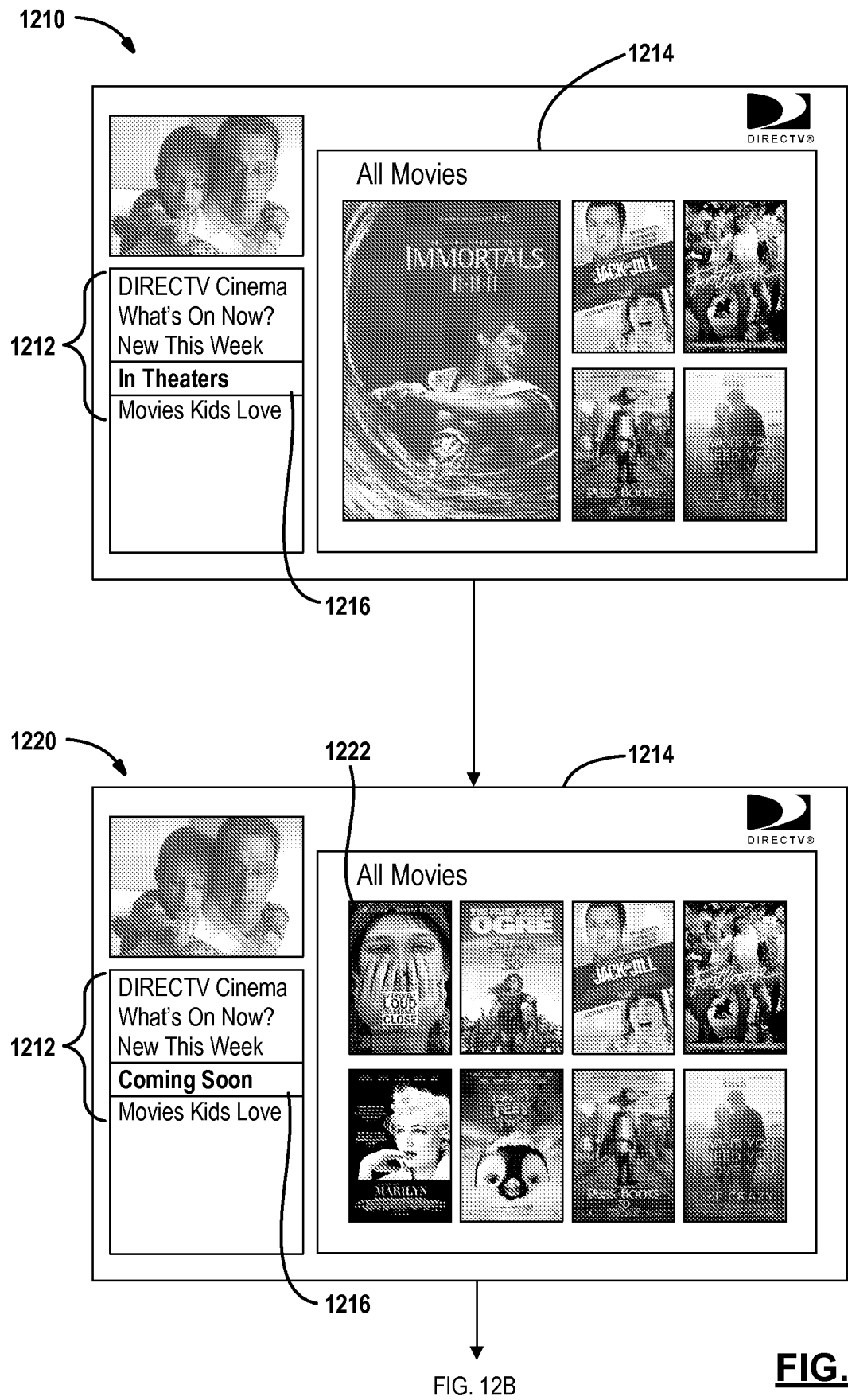
FIGS. 12A-12C are screen displays of a sequence used to illustrate the search saving sequence.
Figure 12B:
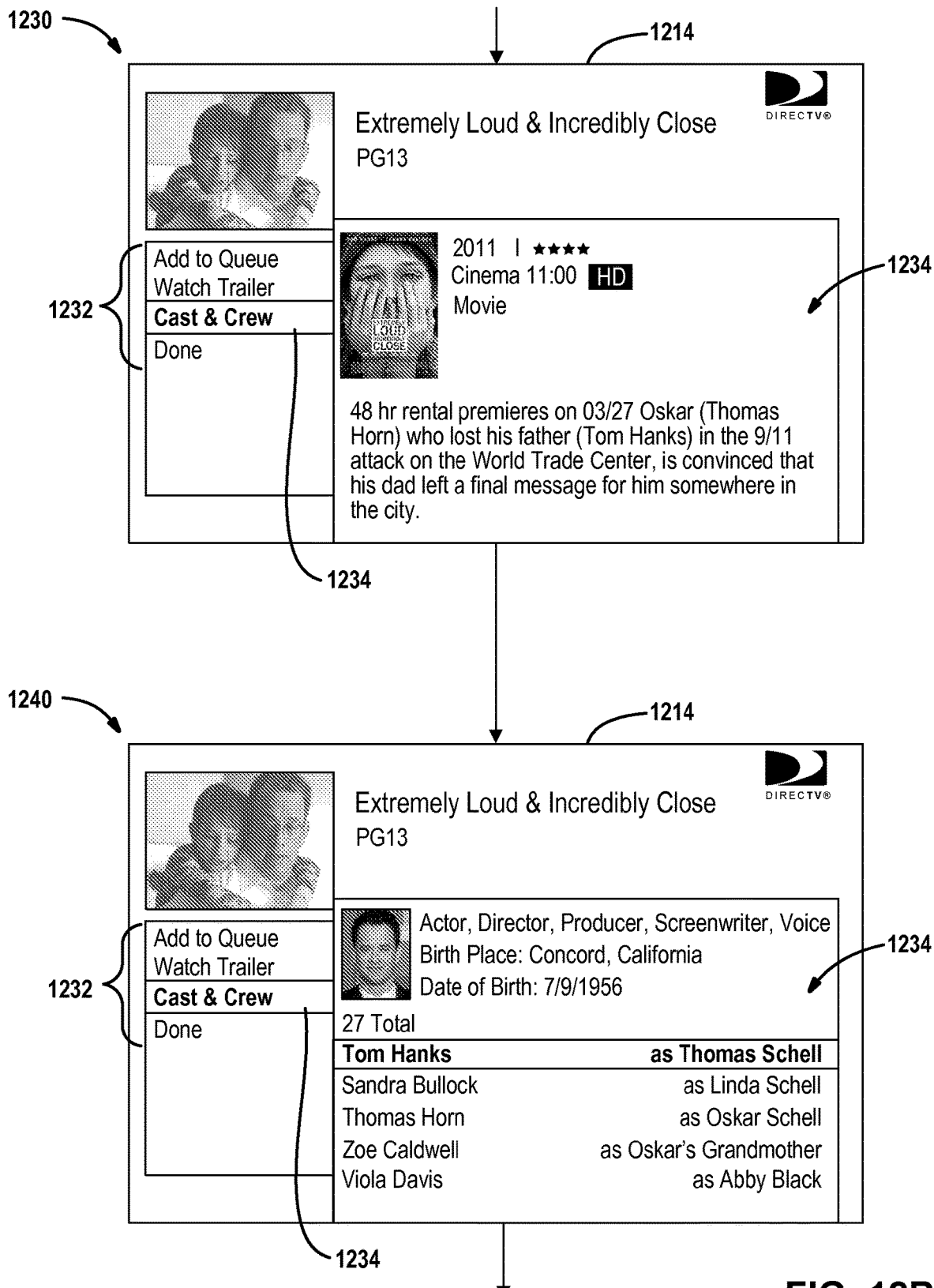
Figure 12C:
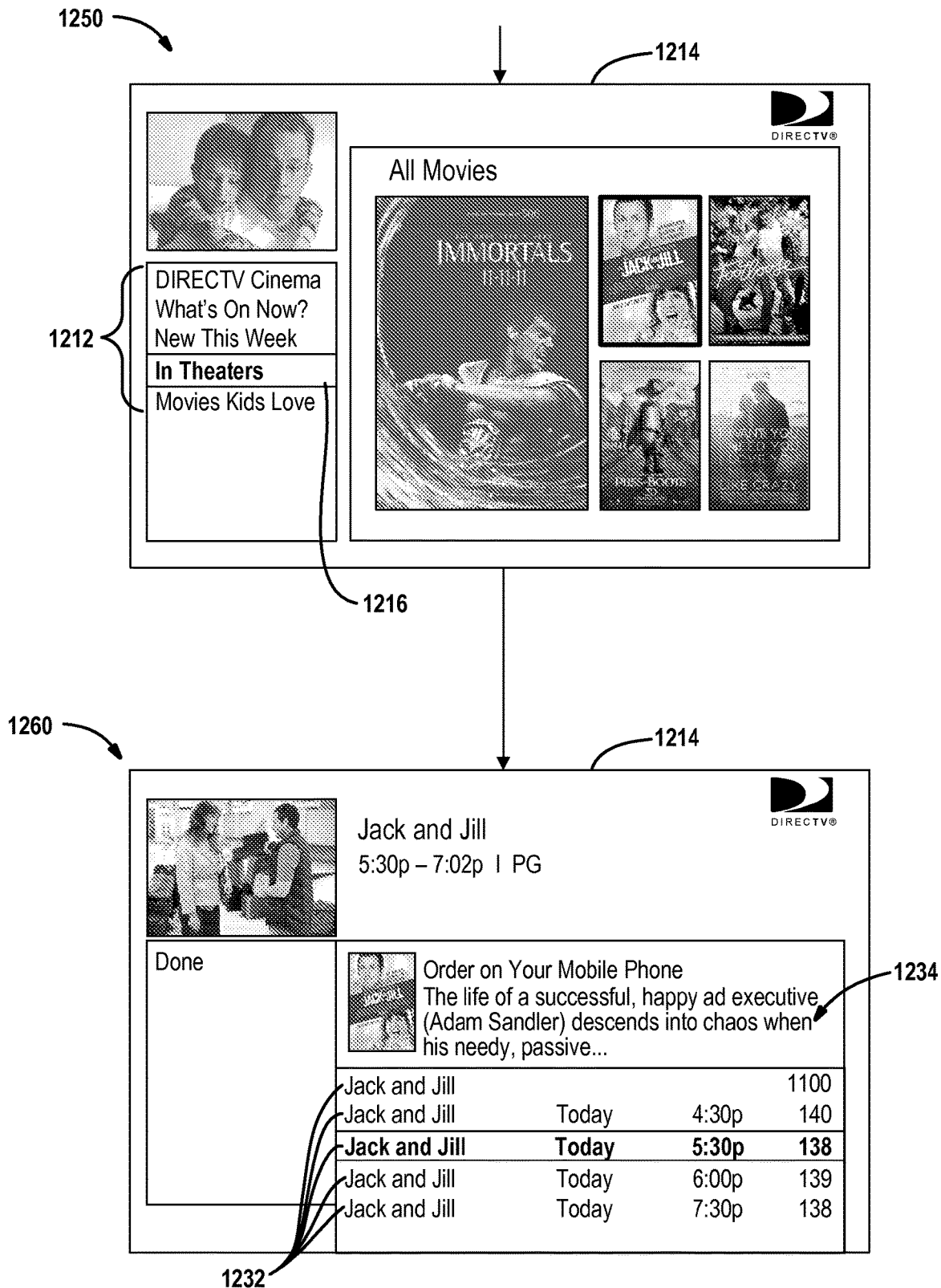

Referring now to FIGS. 12A-12C, examples of search screens having predefined search criteria or search elements are provided in FIG. 12. The screens accessed in FIG. 12 are sequentially accessed from one screen which leads to the next using display commands. Screen 1210 is an example of an "All Movies" screen. On the left side, search criteria 1212 are illustrated for obtaining different results in the results box 1214. The "In Theaters" box is highlighted by selector 1216. As is illustrated, box 1214 includes all movies available in the theaters including "Jack and Jill." Screen 1220 is obtained after selecting "Coming Soon" in screen 1210 after selecting "In Theaters." "Coming Soon" movies may include the movie "Extremely Loud and Incredibly Close" in box 1222. When the selecting box 1222 is used to select "Extremely Loud and Incredibly Close," screen 1230 of FIG. 12B is displayed. Additional search criteria 1232 may be provided on the left portion of screen 1230. One search criterion is "Cast and Crew" which has a highlight box 1234 there around. Screen 1230 may provide data for a description area 1234. Screen 1240 may provide actor data and related data relative to the movie selected and the selection box 1232. Screens 1210-1240 show a natural progression of searching data and events corresponding to an events window. All movies in screen 1210 may provide a wide variety which is then limited down by the "Coming Soon" movies in 1210. However, screen 1210 may be returned to often and thus the search results may be saved. Screen 1250 in FIG. 12C is a repeat of screen 1210 which was returned to by the user for determining what is "In Theaters." Screen display 1260 is generated after selecting "Jack and Jill" in the "All Movies" screen 1210. However, when screen 1210 was returned to as screen 1260, the search was not required to be rerun since the results were stored in the memory.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A method comprising:
   accessing a plurality of search screens displayed on a display device associated with a set user device, each of the plurality of search screens perform a content search of search data;
   generating search results as a result of content searches performed at each of the plurality of search screens;
   storing the search results corresponding to a respective search screen of the plurality of search screens in a memory to form saved search results;
   navigating to a previously accessed search screen of the plurality of search screens;
   receiving new search data to form newly received search data, said new search data providing content on which a search is to be performed;
   after receiving the newly received search data, retrieving the saved search results from the memory, said saved search results corresponding to the previously accessed search screen in response to navigating to the previously accessed search screen;
   searching the newly received search data without searching previously searched data to obtain new search results;
   updating the saved search results with the new search results obtained from searching the newly received search data to form updated search results; and
   displaying the updated search results on the display device.

2. The method as recited in claim 1 wherein the step of accessing comprises sequentially accessing the plurality of search screens.

3. The method as recited in claim 1 wherein navigating comprises navigating to the previously accessed search screen by selecting using a user interface.

4. The method as recited in claim 1 wherein storing the search results comprises storing less than an entire search results based on a search frequency.

5. The method as recited in claim 4 wherein the search frequency comprises a likelihood that one of the plurality of search screens will appear.

6. The method as recited in claim 1 wherein storing the search results comprises storing less than an entire search results based on a search cost.

7. The method as recited in claim 6 wherein the search cost comprises a time to perform a search for a selected search screen.

8. The method as recited in claim 1 further comprising storing only a predetermined number of search results in the memory.

9. The method as recited in claim 1 further comprising exiting the plurality of search screens and in response to exiting, removing the search results from the memory.

10. A system comprising:
    a memory;
    a display device displaying a plurality of search screens on the display device, each of the plurality of search screens performs a content search of search data;
    a search module generating search results as a result of content searches performed at each of the plurality of search screens;
    a search retention module storing the search results corresponding to a respective search screen of the plurality of search screens in the memory to form saved search results, receiving new search data to form newly received search data, said newly received search data providing content on which a search is to be performed, after receiving the new search data, retrieving the saved search results from the memory, said saved search results corresponding to a previously accessed search screen and searching the newly received search data without searching previously searched data to obtain new search results in response to accessing the previously accessed search screen, updating the saved search results obtained from searching the newly received search data with the new search results to form updated search results; and
    a controller displaying the updated search results on the display device.

11. The system as recited in claim 10 wherein the controller sequentially accesses the plurality of search screens.

12. The system as recited in claim 10, further comprising a user interface navigating a set top box to the previously accessed search screen.

13. The system as recited in claim 10 wherein the search results that are stored comprise less than all of the search results based on a search frequency.

14. The system as recited in claim 13 wherein the search frequency comprises a likelihood one of the plurality of search screens will appear.

15. The system as recited in claim 10 wherein the search results that are stored comprise less than all of the search results based on a search cost.

16. The system as recited in claim 15 wherein the search cost comprises a time to perform the content search for a selected search screen.

17. The system as recited in claim 10 wherein the memory stores only a predetermined number of search results in the memory.

18. The system as recited in claim 10 wherein the controller removes the search results from the memory after exiting the plurality of search screens.

19. A non-transitory, machine readable storage media comprising executable instructions that when loaded into a memory and executed by a processor cause the processor to perform operations, the operations comprising:
    accessing a plurality of search screens displayed on a display device associated with a set user device, each of the plurality of search screens perform a content search of search data;
    generating search results as a result of content searches performed at each of the plurality of search screens;

storing the search results corresponding to a respective search screen of the plurality of search screens in a memory to form saved search results;

navigating to a previously accessed search screen of the plurality of search screens;

receiving new search data to form newly received search data, said new search data providing content on which a search is to be performed;

after receiving the newly received search data, retrieving the saved search results from the memory, said saved search results corresponding to the previously accessed search screen in response to navigating to the previously accessed search screen;

searching the newly received search data without searching previously searched data to obtain new search results;

updating the saved search results with the new search results obtained from searching the newly received search data to form updated search results; and displaying the updated search results on the display device.

20. The non-transitory, machine readable storage media as recited in claim 19, wherein storing the search results comprises storing less than an entire search results based on a search frequency.

* * * * *